June 14, 1927.

D. C. PRINCE 1,632,622

CONTROL SYSTEM

Filed May 27, 1925     2 Sheets-Sheet 1

Inventor:
David C. Prince,
by Alexander F. Smith
His Attorney.

June 14, 1927.

D. C. PRINCE

CONTROL SYSTEM

Filed May 27, 1925     2 Sheets-Sheet 2

1,632,622

Inventor:
David C. Prince,
by *[signature]*
His Attorney.

Patented June 14, 1927.

1,632,622

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

CONTROL SYSTEM.

Application filed May 27, 1925. Serial No. 33,273.

My invention relates to systems for controlling the interconnection of electrical circuits, and has for its principal object the provision of an improved switching apparatus wherein electron discharge devices are utilized in a manner to open and close a circuit without producing undesirable fluctuations in its electrical conditions.

It is well known that voltage and current fluctuations are likely to result from switching operations involving considerable amounts of power and that these fluctuations interfere with the operation of apparatus associated with the circuits which have their connections changed. In accordance with my invention, this difficulty is largely obviated by the provision of a circuit control apparatus comprising electron discharge devices and means for changing the conductivity of these devices when the value of the current transmitted therethrough is zero.

My invention will be better understood from the following description when considered in connection with the accompanying drawings and its scope will be pointed out in the appended claims.

Figure 1:
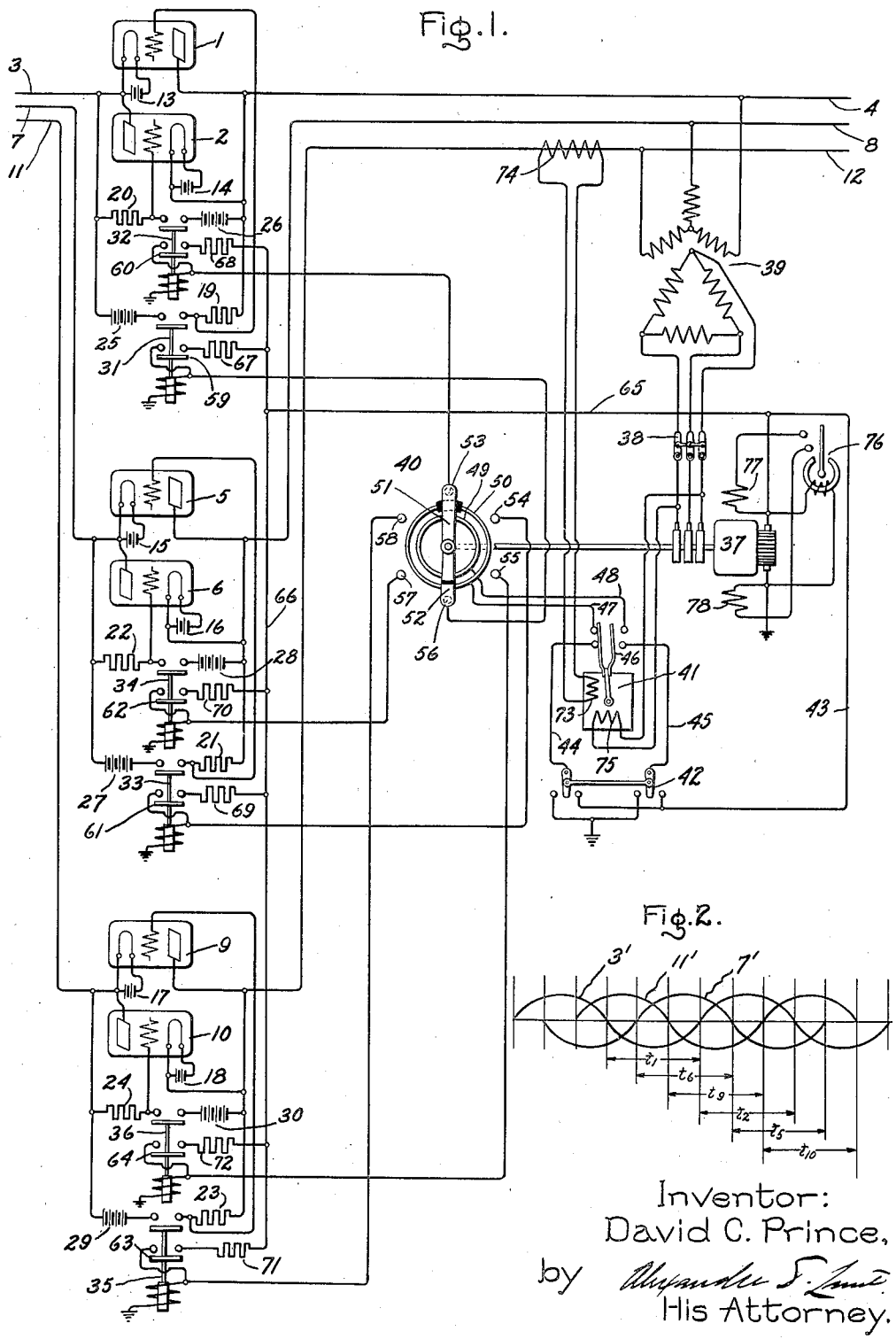
Figure 2:
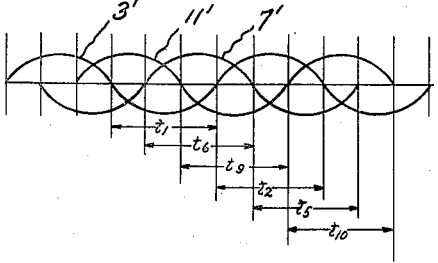
Figure 3:
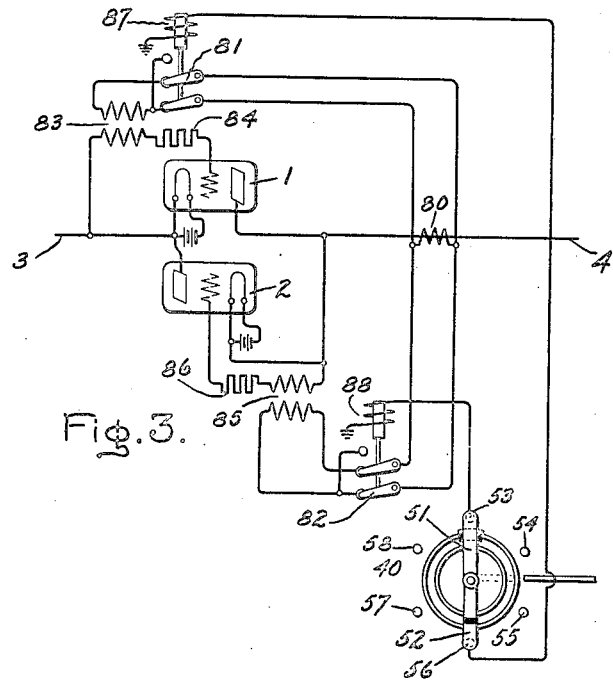
Figure 4:
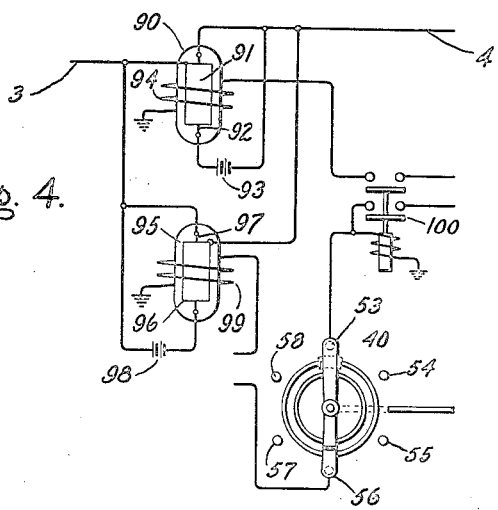

Referring to the drawing, Fig. 1 shows a control system wherein my invention has been embodied; Fig. 2 is an explanatory diagram and Figs. 3 and 4 show various modifications in the system of Fig. 1.

Fig. 1 shows electron discharge devices 1 and 2 which are connected in reverse order between conductors 3 and 4 of a polyphase power transmission or distribution circuit, discharge devices 5 and 6 likewise connected between conductors 7 and 8 of the power circuit, and discharge devices 9 and 10 connected between conductors 11 and 12 of the power circuit. The devices 1, 2, 5, 6, 9 and 10 each comprise an anode, a grid and a cathode, the cathodes of the devices being maintained at the proper temperature by means of current supplied from batteries 13, 14, 15, 16, 17 and 18 respectively and the anodes of the devices being connected to the corresponding grids through resistors 19 to 24 which are provided for maintaining the grids at positive potentials when the devices are transmitting current. With the connections of devices 1, 2, 5, 6, 9 and 10 as shown, it will be readily understood that current will be transmitted between the two parts of the power line through devices 1, 5 and 9 during one half a cycle and through devices 2, 6 and 10 during the other half cycle.

In order to interrupt or prevent the transmission of current between the two parts of the power circuit, it is necessary that the grids be maintained at potentials which preclude the transmission of current through the devices when their cathodes are charged to a negative potential. It is furthermore desirable that these potentials be first applied when no current is being transmitted through the devices. The batteries 25 to 30 and switches 31 to 36 are provided for accomplishing these results.

The energization of the switch operating coils is controlled by means comprising a synchronous machine 37 shown as connected to the power line through a switch 38 and a transformer 39, a contact device 40 coupled to the machine 37, a power directional relay 41, and double throw switch 42 which is provided for connecting the switch operating coils to the commutator of the machine 37 through conductor 43, conductor 44 or 45, contact member 46 of power directional relay 41, conductor 47 or 48, ring 49 or 50, rotatable segment 51 or 52 of contact device 40 and the corresponding contacts 53, 54, 55, 56, 57 or 58 of the contact device 40. The switches 31 to 36 are provided with auxiliary contact members 59 to 64 which in the closed positions of the switches establish holding circuits for the switch operating coils through conductors 65 and 66 and resistors 67 to 72 respectively. It will be observed that the current coil 73 of the power directional relay 41 is connected to the power line through a current transformer 74; that the voltage coil 75 of this relay is connected to the power line in parallel with the motor 37; and that a polarized relay 76 is provided for causing energization of the motor field circuits 77 and 78 when the motor has been accelerated by induction motor action or otherwise and the correct polarity of the commutator brushes of the synchronous machine has been established.

Assuming the power circuit to be energized and the switch 38 to be closed, the machine 37 will accelerate due to the currents induced in its pole pieces by the rotating field of its armature, the polarized relay will operate to connect the field windings 77 and 78 to the commutator brushes when the motor has accelerated and is operating with the proper polarity at the brushes, and the motor will function both as a rotary converter to supply direct current to the motor field circuits and system control circuits and as a motor to drive the contact segments 51 and 52 of the device 40 in synchronism with the frequency of the power line. It will be apparent that with these connections closure of the switch 38 will always produce the same relation between the polyphase potentials of the power line conductors and the positions of the contact segments 51 and 52 of device 40. The position of the contact member 46 of the power directional relay 41 is determined by the direction of power transmission between the two parts of the power line and may be assumed to be as illustrated when power is transmitted from conductors 4, 8 and 12 to conductors 3, 7 and 11.

With the contact member 46 of relay 41 in the position illustrated and switch 38 closed, the contact segments 51 and 52 are rotated at synchronous speed in a manner to engage contacts 53 to 58 successively. The switch operating coils connected to these contacts are not energized, however, for the reason that the circuit between the machine 37 and these coils is interrupted at the switch 42. Assuming clockwise rotation of contact members 51 and 52, closure of switch 42 in its right hand position causes the contact member 52 successively to complete circuits for energizing the operating coils of switches 31, 34, 35, 32, 33 and 36 thus producing closures of these switches, rendering the electron discharge devices 1, 6, 9, 2, 5 and 10 non-conductive in the order named, and causing auxiliary contact members 59, 62, 63, 60, 61 and 64 to complete the holding circuits previously mentioned by which the switches are maintained in closed position.

It is well known that electron discharge devices of the type shown are capable of conducting current only in one direction. With the arrangement shown, each of the electron discharge devices is rendered non-conductive when it is not transmitting current. The manner in which this is accomplished will be readily understood upon consideration of the curves of Fig. 2 in connection with the apparatus of Fig. 1.

In Fig. 2, the currents of conductors 3, 7, and 11 at successive instants of time are represented by the curves 3', 7' and 11' respectively. Assuming instantaneous action of the switches, it is evidently possible, with a definite relation established between the frequency of the power line and the rotational speed of the contact members 51 and 52 as previously described, to change the grid potential of the discharge devices in a manner to render them non-conductive at any desired instant of time. In accordance with my invention, the apparatus is so arranged that the device 1 is rendered non-conductive when the curve 3' has a negative value and the device 2 is rendered non-conductive when the curve 3' has a positive value. The devices 5 and 6 and devices 9 and 10 are likewise so arranged as to be rendered non-conductive during successive cycles of the current transmitted through conductors 7 and 11 respectively. In the illustrated position of the contact member 46, the device 1 is thus rendered non-conductive at an instant of time during the interval $t_1$, (see Fig. 2), and devices 6, 9, 2, 5 and 10 are rendered non-conductive during intervals of time $t_6$, $t_9$, $t_2$, $t_5$, and $t_{10}$, respectively. It will, of course, be understood that the contacts 53 to 58 may be made longer than illustrated in order to lengthen the intervals of time during which current is supplied to the switch operating coils through contact device 40. The switches 31 to 36 may be any suitable type of high speed switch, such as that described in United States reissued Letters Patent of John G. Tritle, No. 15,441, Aug. 29, 1922, for example. Switches operating at the termination of a definite time interval after the energization of their operating coils also may be utilized to change the conductivity of the electron discharge devices in the proper order and at the proper instants of time.

So long as the synchronous machine 37 is operating, the switches 31 to 36 are maintained in closed position by current supplied through their respective holding circuits and the transmission of current between conductors 3, 7 and 11 and conductors 4, 8, and 12 of the power transmission circuit is prevented. In order to establish the transmission of current through the power circuit, the switch 42 is moved to its left hand position, thus causing the switch operating coils to be successively short circuited and deenergized in a manner to initiate the transmission of current through each of the electron discharge devices at instants of time immediately after the current in the various phase conductors of the power circuit passes through its zero value. In this manner, the various discharge devices are rendered non-conductive or conductive during intervals of time when they are transmitting no current and current is permitted to start from its instantaneous zero value when the power circuit is closed. Since reversal of the direction in which power is transmitted between the two sections of the power circuit produces a change of 180 electrical degrees in the current waves of the various conductors, it is essential that the electron discharge devices be rendered non-conductive in a different order when the direction of power transmission is reversed. This result is accomplished through the power directional relay 41, the contact member 46 of which is moved to its right hand position, for example, when power is transmitted to conductors 4, 8 and 12 from conductors 3, 7 and 11. With the contact member 46 in this position, the switch operating coils are connected to the synchronous machine 37 through switch 42, the contacts of power directional relay 41 and contact 51 of contact device 40 in a manner to cause the electron discharge devices 2, 5, 10, 1, 6 and 7 to be rendered non-conductive in the order named. In view of the preceding explanation, it will be apparent that, with the direction of power transmission reversed, the change in the conductivity of each of the electron discharge devices is likewise effected when no current is being transmitted through the device.

Fig. 3 shows a slightly different arrangement for controlling the grid potentials of the electron discharge devices. In this arrangement a current transformer 80 supplied with current from the conductors 3 and 4 is connected to the grid circuits of devices 1 and 2 through the reversing switches 81 and 82 respectively, a potential transformer 83 and current limiting resistor 84 being interposed between the current transformer 80 and the grid circuit of device 1 and a potential transformer 85 and resistor 86 being interposed between transformer 80 and the grid circuit of device 2. The switches 81 and 82 are provided with operating coils 87 and 88 which are connected to the synchronously operated contact device 40 in a manner previously explained. With these connections the potential of the current transformer 80 is utilized in a manner to change the conductivity of the electron discharge devices when they are not transmitting current. It will be apparent that the arrangements of Figs. 1 and 3 may be utilized to control the connections of a power circuit having any number of phases, the number and spacing of the contacts of device 40 being modified to suit the particular requirements of each case.

Fig. 4 shows a further modification wherein a different type of electron discharge device is utilized to interrupt the transmission of current between conductors 3 and 4. The discharge device 90 comprises an anode 91 connected to conductors 3, a cathode 92 connected to conductor 4 and to a heating battery 93, and a magnetic control coil 94 for interrupting the transmission of current through device 90 in response to operation of contact device 40, a switch 100 being provided for closing the circuit of control coil 94 and completing a holding circuit by which this switch is maintained closed. The discharge device 95 likewise comprises an anode 96, a cathode 97, and a control coil 99, a battery 98 being provided for heating the cathode of the device and a switch (not shown) similar to switch 100 being utilized to control the connections of control coil 99. It will be observed that the devices 90 and 95 are connected between conductors 3 and 4 in reverse order. With these connections, the contact device 40 operates to interrupt the transmission of current through the discharge devices is a manner which will be readily understood without further explanation.

The embodiments of the invention illustrated and described herein have been selected for the purpose of clearly setting forth the principles involved. It will be apparent, however, that the invention is susceptible of being further modified to meet the different conditions encountered in its use and I therefore aim to cover by the appended claims all modifications within the true spirit and scope of my invention.

What I claim as new and desire to secure by Letters Patent of the United States, is:

1. The combination of an alternating current circuit comprising a plurality of sections, electron discharge devices connected between said sections in reverse order for transmitting current therebetween, and means operated in synchronism with said circuit for causing each of said devices to be rendered non-conductive when the current transmitted therethrough is zero.

2. The combination of an alternating current circuit comprising a plurality of sections, electron discharge devices connected between said sections in reverse order for transmitting current therebetween, and a synchronous contact device for causing the conductivity of each of said electron discharge devices to be changed only when the current transmitted therethrough is zero.

3. The combination of an alternating current circuit comprising a plurality of sections, electron discharge devices connected between said sections in reverse order for transmitting current therebetween, and means operable in synchronism with the frequency of said circuit for causing the conductivity of each of said devices to be changed when the current transmitted therethrough is zero.

4. The combination of an alternating current circuit comprising a plurality of sections, electron discharge devices connected between said sections in reverse order for transmitting current therebetween, means for successively changing the conductivity of said devices, and means operable in accordance with the direction of power transmission between said sections for controlling the order in which the conductivities of said devices are changed.

5. The combination of an alternating current circuit comprising a plurality of sections, electron discharge devices connected between said sections in reverse order for transmitting current therebetween, and means including a contact device and a synchronous machine coupled to said contact device and arranged to be operated in synchronism with the frequency of said circuit for causing the conductivities of said discharge devices to be changed in predetermined order and at predetermined instants of time.

6. The combination of an alternating current circuit comprising a plurality of sections, electron discharge devices connected between said sections in reverse order for tarnsmitting current therebetween, means including a contact device and a synchronous machine coupled to said contact device and arranged to be operated in synchronism with the frequency of said circuit for causing the conductivities of said discharge devices to be changed in predetermined order and at predetermined instants of time, and means operable in accordance with the direction of power transmission between said sections for controlling the order in which the conductivities of said devices are changed.

7. The combination of an alternating current circuit comprising a plurality of sections, electron discharge devices connected between said sections in reverse order for transmitting current therebetween, means including a contact device and a synchronous machine coupled to said contact device and arranged to be operated in synchronism with the frequency of said circuit for causing the conductivities of said discharge devices to be changed in predetermined order and at predetermined instants of time, and a power directional relay connected to said circuit for controlling the order in which the conductivities of said devices are changed.

8. The combination of an alternating current circuit comprising a plurality of sections, electron discharge devices connected between said sections in reverse order for transmitting current therebetween, circuit control means for changing the conductivities of said devices, and means operable in accordance with the frequency of said circuit for causing said circuit control means to be operated in predetermined order and at predetermined instants of time.

9. The combination of an alternating current circuit comprising a plurality of sections, electron discharge devices connected between said sections in reverse order for transmitting current therebetween, circuit control means for changing the conductivities of said devices, means operable in accordance with the frequency of said circuit for causing said circuit control means to be operated in predetermined order and at predetermined instants of time, and means arranged to complete a holding circuit by which said circuit control means are maintained in closed position.

10. The combination of an alternating current circuit comprising a plurality of sections, electron discharge devices connected between said sections in reverse order for transmitting current therebetween, circuit control means for changing the conductivities of said devices, means operable in accordance with the frequency of said circuit for causing said circuit control means to be operated in predetermined order and at predetermined instants of time, means arranged to complete a holding circuit by which said circuit control means are maintained in closed positions, and means for deenergizing said holding circuit.

11. The method of interrupting the transmission of power in a system wherein electron discharge devices are provided with cathodes and anodes connected between conductors in reverse order and with grids arranged to control the current transmitted between said cathodes and anodes, which comprises changing the grid potential of each of said devices when the current transmitted therethrough is zero.

12. The method of interrupting the transmission of power in a system wherein electron discharge devices are connected between conductors in reverse order, which comprises changing the conductivities of said devices in synchronism with the frequency of said system and at times when the current therethrough is zero.

In witness whereof, I have hereunto set my hand this 26th day of May 1925.

DAVID C. PRINCE.